United States Patent
Yates

(10) Patent No.: US 6,506,271 B1
(45) Date of Patent: Jan. 14, 2003

(54) ELASTOMER FILM LAMINATED CUSHION METHOD

(76) Inventor: Paul M. Yates, 5814 Briar Tree Dr., LaCanada, CA (US) 91011

( * ) Notice: Subject to any disclaimer, the term of this patent is extended or adjusted under 35 U.S.C. 154(b) by 87 days.

(21) Appl. No.: 09/764,534

(22) Filed: Jan. 16, 2001

Related U.S. Application Data

(62) Division of application No. 09/286,949, filed on Apr. 8, 1999, now Pat. No. 6,413,609.

(51) Int. Cl.[7] .................................................. B41J 29/00
(52) U.S. Cl. ............................ 156/79; 156/77; 156/78; 248/118; 248/118.1; 400/715; 400/719
(58) Field of Search ............................. 156/77, 78, 79; 400/715, 719; 248/118, 118.1

(56) References Cited

U.S. PATENT DOCUMENTS 5,593,769 A * 1/1997 Wolf et al. ................. 428/36.1
5,641,369 A * 6/1997 Kirchhoff et al. ......... 156/308.4
5,713,544 A * 2/1998 Wolf et al. .................. 400/715
5,980,143 A * 11/1999 Bayer et al. ................ 400/715

* cited by examiner

Primary Examiner—Jeff H. Aftergut
(74) Attorney, Agent, or Firm—Walter A. Hackler

(57) ABSTRACT

An elastomer film laminated cushion includes an elastomer having the physical properties of flexibility and compressibilities in the range of flexibilities and compressibilities of stable elastomer block polymer gels. A film is provided for encapsulating the elastomer with the film having physical properties of flexibility to enable uninhibited flexure compression of the elastomer by a user. A compatibilizing layer is provided for laminating the film to an exterior of the elastomer. The compatibilizing layer also has physical properties of flexibility to enable uninhibited flexure and compression of the elastomer by the user.

6 Claims, 1 Drawing Sheet

ELASTOMER FILM LAMINATED CUSHION METHOD

This application is a division of U.S. Ser. No. 09/286,949 filed Apr. 8, 1999, now U.S. Pat. No. 6,413,609.

The present invention generally relates to cushions and is more particularly directed to a cushion utilizing an elastomeric gel.

Cushions heretofore available have been made from a great number of materials such as foams and gels. In particular, stable elastomeric block polymer gels 'such as those described in U.S. Pat. No. 3,676,387 have been utilized which are polymer-oil combinations. Elastomeric block polymers have been combined with oils in order to control the flexibility and compressibilities of the gels. For example, when an elastomer block polymer, such as described in the hereinabove referenced U.S. Pat. No. 3,676,387, is combined with a non-aromatic paraffinic oil low volatility, an extremely highly elastic material can be obtained. This gel is thermoplastic/thermosetting and is capable of being melted upon heating for casting in the formation of molded or other articles at room temperature.

Unfortunately, these gels, after formation, tend to exude oil over long periods of time. Accordingly, in order to utilize these gels in an acceptable cushion, they must be encapsulated or covered with a material to prevent-seepage of oil therefrom, which can cause staining to any support used for the cushion or provide an uncomfortable oily-like surface if in direct contact with a user.

Accordingly, such gels have been bonded to fabrics and films in order to encapsulate the gels. The bonding or lamination of the gel is typically done at high temperatures, for example, about 400° F., and when used with very thin films, such heated contact can cause shriveling, or bubbling of the film, which results in an unattractive finished product. The use of very thin films is very important in the overall suitability of the cushion in order to prevent restriction of the flexibility and compressibility of the elastomer gel.

That is, uninhibited elastomer gel properties of flexibility and compressibility are desired in the final product. Heretofore, films utilized to encapsulate the elastomer gels require sufficient thickness to prevent the hereinabove noted stretching and bubbling of the film upon formation of the cushion. Unfortunately, such thick films inhibit the flexural and compressible characteristics of the gel which reduces the flexural and compressibility characteristics of the completed cushion.

The present invention is directed to an elastomer film laminated cushion which maintains the properties of the elastomer gel utilized, while at the same time providing a barrier for oil seepage from the elastomer gel into the environment.

SUMMARY OF THE INVENTION

An elastomer film laminated cushion in accordance with the present invention generally includes an elastomer having the physical properties of flexibility and compressibility in the range of flexibilities and compressibilities of stable elastomer block polymer gels. The film provides a means for encapsulating the elastomer with the film having the physical properties of flexibility to enable uninhibited flexure and compression of the elastomer by a user.

Importantly, a compatibilizing layer provides a means for laminating the film to an exterior of the elastomer. More particularly, the compatibilizing means enables the heat lamination of the elastomer to the film at temperatures up to about 400° F. without shriveling and/or bubbling of the film.

Also, the compatibilizing layer means has physical properties of flexibility to enable uninhibited flexure and compression of the elastomer by a user.

The physical properties of both the film and the compatibilizing layer are important in order to enable the cushion to provide desirable flexibility and compressibility of the elastomer, while at the same time preventing any oil leakage from the cushion.

More particularly, when the film is formed from a urethane resin and the elastomer is formed from elastomer resin, the compatibilizing layer means comprises a mixture of the urethane resin and the elastomer resin or a compatible elastomer resin.

In order to provide desired physical properties of the film and the compatibilizing layer, the film should have a thickness of between about 1 mil and about 5 mils and the compatibilizing layer should have a thickness of between about 10 mils and about 15 mils. With these thicknesses, the flexibility and compressibility properties of the gel are uninhibited and thus the physical properties of the resulting cushion are substantially the same as those of the elastomer.

Still more particularly, the compatibilizing layer mixture may comprise about 25 percent urethane resin and about 75 percent elastomer resin.

A method in accordance with the present invention for producing an elastomer film laminated cushion generally includes the steps of providing a thermosetting elastomer resin and a urethane film.

A compatibilizing layer is applied on to the film with the compatibilizing layer comprising a mixture of urethane resin and additional elastomer resin.

The elastomer resin is heated to form a gel and thereafter laminated to the compatibilizing layer at temperatures of up to about 400°. A gel forms an elastomeric body having physical properties of flexibility and compressibilities in the range of flexibilities and compressibilities of stable elastomer block polymer gels.

BRIEF DESCRIPTION OF THE DRAWINGS

The present invention may be more clearly understood with reference to the following detailed description in conjunction with the appended drawings, of which.

DETAILED DESCRIPTION

Figure 1:
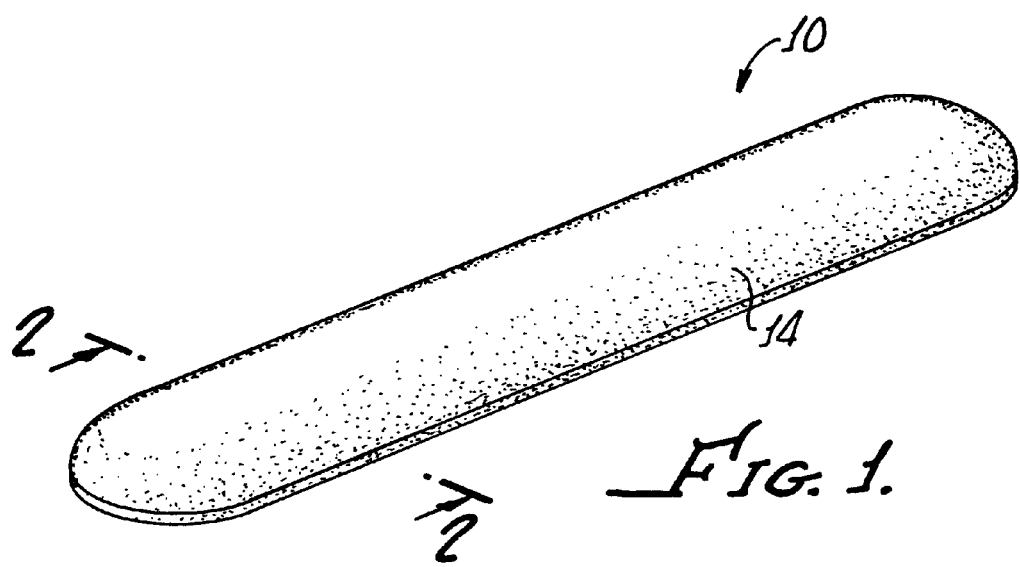
FIG. 1 is a perspective view of a typical cushion made in accordance with the present invention.
Figure 2:
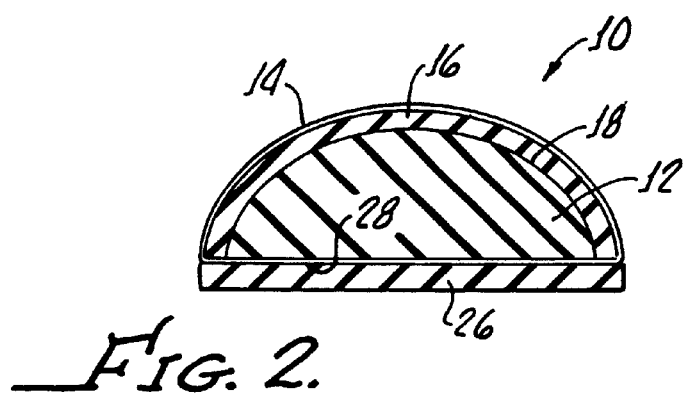
FIG. 2 is a cross sectional view of the cushion shown in FIG. 1 taken along the line 2—2 showing a cross section of an elastomer encapsulated by a film with a compatibilizing layer therebetween.

With reference to FIG. 1 there is shown an elastomer film laminated cushion 10 in accordance with the present invention, which, as is more particularly shown in FIG. 2, includes an elastomer 12 and a film 14 which provides a means for encapsulating the elastomer 12. As hereinabove noted, encapsulation of the elastomer 12 is important for providing a barrier to plasticizing oil which may be utilized in the elastomer.

The elastomer 12 may be of any suitable type such as, for example, a stable isomeric block polymer gel similar to the gel described in U.S. Pat. No. 3,676,387. This patent is incorporated herewith in its entirety for the purpose of describing a suitable type of gel for incorporation into the present invention.

Generally, the gels are of polymer-oil combinations. Specifically, the elastomer 12 has the physical properties of flexibility and compressibility in the range of flexibilities and compressibilities of the stable elastomer block polymer gels such as set forth in U.S. Pat. No. 3,676,387.

Figure 3:
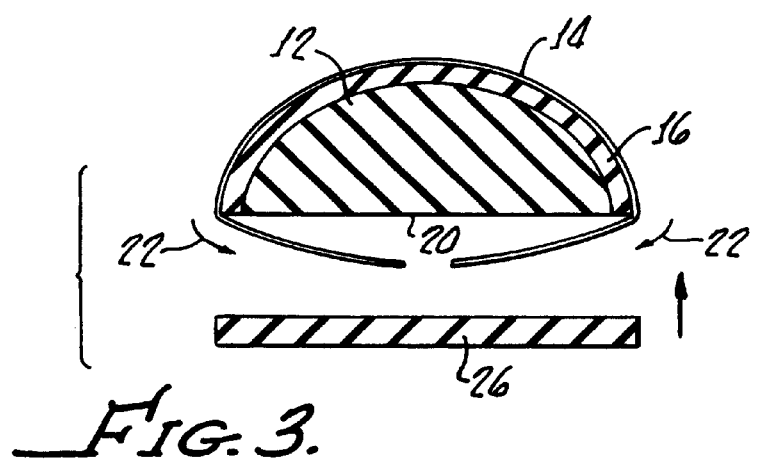
FIG. 3 is a representation of the method of producing the cushion in accordance with the present invention.

With reference to FIGS. 2 and 3, the transparent film 14 may be of urethane, or polyurethane film, which encapsulates the elastomer 12. The film 14 thickness as hereinabove noted is preferably between about 1 mil and about 5 mils in order to encapsulate the elastomer 12 and have a resiliency which enables uninhibited flexibility and compression of the elastomer 12 by a user's wrist (not shown).

That is, the film 14 has physical properties of flexibility, because of its thickness, to enable uninhibited flexure and compression of the elastomer 12 by the user. A film 14 thickness beyond this range has not been found to be effective in maintaining the gel-like property of the elastomer 12 while providing encapsulation of the elastomer 12.

Importantly, a compatibilizing layer 16 provides a means for laminating the film 14 to an exterior 18 of the elastomer 12 at temperatures up to about 400° F. without shriveling and/or bubbling of the film 14 during the process.

In order to maintain the flexibility and compressibility properties of the elastomer 12, the compatibilizing layer 16 must have physical properties of flexibility to enable such uninhibited flexure and compression of the elastomer by the user. The flexibility properties of both the film 14 and the compatibilizing layer 16 are effected when the film 14 is made from a urethane film having a thickness of between about 1 mil and about 5 mils.

The compatibilizing layer is a mixture of urethane resin and elastomer resin, preferably about 25 percent urethane resin and about 75 percent elastomer resin. The urethane and elastomer resins are heated to a lower temperature than about 400° F. and applied to the film 14 in a conventional manner.

Thereafter, as is illustrated in FIG. 3, the elastomer 12 is applied to the compatibilizing layer 16 and the film 14 is sealed to an underside 20 of the elastomer 12 as illustrated by the arrows 22 in FIG. 3.

The basic process of forming the cushion 10 may be through the process set forth in U.S. Pat. No. 5,679,193 entitled, METHOD OF MANUFACTURING A GEL CUSHION; U.S. Pat. No. 5,756,184 entitled, GEL CUSHION; and in U.S. patent application Ser. No. 08/856,775 filed May 15, 1997, entitled, CUSHION MANUFACTURING METHOD. Both of these referenced patents and the application are incorporated herewith in their entirety by this reference thereto, for illustrating the manner in which the gel cushion in accordance with the present invention may be manufactured.

An additional compatibilizing layer 26 may be applied to an underside 28 of the cushion 10 for the purpose of obtaining a gripy bottom for the cushion 10. Since the layer, which is also formed from a mixture of urethane resin and elastomer resin, is rubbery, somewhat like the gel 12, it provides a non-slip bottom texture similar to neoprene products on the market. If the film 14 is not sealed to the bottom 20 of the elastomer, the layer 26, because of its urethane content, provides a barrier to prevent the leakage of oil from the elastomer 12 onto a supporting surface, not shown.

Although there has been hereinabove described an elastomer film laminated cushion in accordance with the present invention, for the purpose of illustrating the manner in which the invention may be used to advantage, it will be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A method for producing an elastomeric film laminated cushion comprising the steps of:

providing thermosetting elastomer resin;

providing a urethane film;

applying to the film a compatibilizing layer onto the film, said compatibilizing layer comprising a mixture of urethane resin and additional elastomer resin;

heating the elastomer resin to form a gel; and laminating the gel to said compatibilizing layer at a temperature of up to about 400° F., said gel forming an elastomeric body having the physical properties of flexibility and compressibility in the range of flexibilities and compressibilities of stable elastomeric block polymer gels.

2. The method according to claim 1 further comprising the steps of sealing the film means together around the gel in order to encapsulate the gel.

3. The method according to claim 1 wherein said mixture comprises about 25 percent urethane resin and about 75 percent elastomer resin.

4. The method according to claim 3 wherein said film has a thickness of between about 1 mil and about 5 mils.

5. The method according to claim 4 wherein said compatibilizing layer has a thickness of between about 10 mils and about 15 mils.

6. The method according to claim 5 wherein said elastomer is a stable elastomer block polymer gel-oil composition.

* * * * *